United States Patent
Oota

(10) Patent No.: US 10,741,988 B2
(45) Date of Patent: Aug. 11, 2020

(54) LASER MACHINING DEVICE

(71) Applicant: FANUC CORPORATION, Yamanashi (JP)

(72) Inventor: Kazuya Oota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/943,901

(22) Filed: Apr. 3, 2018

(65) Prior Publication Data
US 2018/0301862 A1    Oct. 18, 2018

(30) Foreign Application Priority Data

Apr. 17, 2017 (JP) .................................. 2017-081458

(51) Int. Cl.
*H01S 3/036* (2006.01)
*H01S 3/038* (2006.01)
(Continued)

(52) U.S. Cl.
CPC .............. *H01S 3/036* (2013.01); *H01S 3/038* (2013.01); *H01S 3/097* (2013.01); *H01S 3/104* (2013.01);
(Continued)

(58) Field of Classification Search
CPC . H01S 3/097; H01S 3/22; H01S 3/036; H01S 3/038; H01S 3/03; C25F 1/00
(Continued)

(56) References Cited

U.S. PATENT DOCUMENTS

| 4,718,071 A * | 1/1988 | Steffen ................. H01S 3/0346 372/33 |
| 8,083,862 B2 * | 12/2011 | Brown ................. B08B 7/0071 134/19 |

(Continued)

FOREIGN PATENT DOCUMENTS

| JP | H06-232481 | * | 8/1994 | ............ H01S 3/036 |
| JP | H06-232481 A | | 8/1994 | |

(Continued)

OTHER PUBLICATIONS

An Office Action; "Notification of Reasons for Refusal," mailed by the Japanese Patent Office dated Oct. 23, 2018, which corresponds to Japanese Patent Application No. 2017-081458 and is related to U.S. Appl. No. 15/943,901; with English language translation.

*Primary Examiner* — Tuan N Nguyen
(74) *Attorney, Agent, or Firm* — Studebaker & Brackett PC

(57) ABSTRACT

A laser machining device capable of recovering an exhaust performance of a dry pump easily is provided. A laser machining device includes: an oscillating portion that generates a machining laser beam G; an enclosure portion in which a first gas is enclosed; and an exhausting portion that exhausts the first gas together with a dirt generated in the enclosure portion in association with an operation of the oscillating portion. The exhausting portion includes: a dry pump; a first line that connects the enclosure portion and the dry pump; a second line that supplies a second gas having a higher pressure than the first gas to the dry pump; a valve portion that opens or closes the first line and the second line; and a control unit that controls opening or closing of the valve portion.

12 Claims, 13 Drawing Sheets

(51) Int. Cl.
*H01S 3/097* (2006.01)
*H01S 3/104* (2006.01)
*H01S 3/22* (2006.01)
*H01S 3/03* (2006.01)
*H01S 3/10* (2006.01)
*H01S 3/223* (2006.01)

(52) U.S. Cl.
CPC ....... *H01S 3/22* (2013.01); *H01S 3/03* (2013.01); *H01S 3/10069* (2013.01); *H01S 3/2232* (2013.01)

(58) Field of Classification Search
USPC ................................. 372/55, 58, 61; 134/1.2
See application file for complete search history.

(56) References Cited

U.S. PATENT DOCUMENTS

| | | | | |
|---|---|---|---|---|
| 8,231,732 | B2* | 7/2012 | Nakagawa | H01J 37/32862 134/1 |
| 2001/0044161 | A1* | 11/2001 | Komiyama | F24F 3/161 438/14 |
| 2004/0077511 | A1* | 4/2004 | Barnes | C11D 11/0041 510/175 |
| 2004/0182415 | A1* | 9/2004 | Yoon | B08B 7/00 134/1.2 |
| 2007/0186952 | A1* | 8/2007 | Honda | B08B 7/0035 134/1.1 |
| 2008/0057359 | A1* | 3/2008 | Venkataraman | H01M 8/04089 429/423 |
| 2015/0109377 | A1* | 4/2015 | Yamada | B41J 2/17506 347/85 |
| 2016/0013606 | A1* | 1/2016 | Matsuda | H01S 3/036 372/59 |
| 2016/0254635 | A1* | 9/2016 | Takazane | H01S 3/0407 372/35 |
| 2017/0082587 | A1* | 3/2017 | Izumi | B23K 26/142 |
| 2017/0306802 | A1* | 10/2017 | Shaaban | F01K 17/02 |

FOREIGN PATENT DOCUMENTS

| | | | | |
|---|---|---|---|---|
| JP | H10-303147 | A | 11/1998 | |
| JP | 2001-358386 | A | 12/2001 | |
| JP | 2011-189229 | A | 9/2011 | |
| JP | 2011-222545 | * | 11/2011 | ............ H01S 3/036 |
| JP | 2011-222545 | A | 11/2011 | |
| JP | 2013-124659 | * | 6/2013 | ............ F04B 37/16 |
| JP | 2013-124659 | A | 6/2013 | |

* cited by examiner

LASER MACHINING DEVICE

This application is based on and claims the benefit of priority from Japanese Patent Application No. 2017-81458, filed on 17 Apr. 2017, the content of which is incorporated herein by reference.

BACKGROUND OF THE INVENTION

Field of the Invention

The present invention relates to a laser machining device including an oscillating portion that generates a machining laser beam, an enclosure portion in which gas is enclosed, and an exhausting portion that exhausts gas together with dirt generated in the enclosure portion in association with the operation of the oscillating portion.

Related Art

Conventionally, a laser machining device which uses a carbon dioxide gas ($CO_2$), for example, as a laser medium (a medium gas) is known. The laser machining device generates a laser beam by causing an oscillating portion to excite the medium gas. The laser beam is used for machining a work and is radiated to the work disposed in a chamber, for example.

The medium gas deteriorates by the excitation in the oscillating portion. When a laser beam is to be generated stably, it is necessary to replace the deteriorated medium gas with a fresh medium gas. Therefore, a laser machining device in which a supply line that supplies a medium gas and an exhaust line that exhaust the deteriorated medium gas are connected has been proposed (for example, see Patent Document 1).

Patent Document 1: Japanese Unexamined Patent Application, Publication No. 2011-222545

SUMMARY OF THE INVENTION

According to the laser machining device disclosed in Patent Document 1, a circulation path for circulating a medium gas is connected to an oscillating portion. A blower is disposed in the circulation path. The medium gas enclosed inside the oscillating portion and the circulation path is forcibly circulated by the blower. The circulation path is connected to the supply line and the exhaust line. In this way, a certain amount of medium gas is circulated while being replaced. Therefore, it is possible to continue generating a laser beam while replacing the medium gas deteriorated by excitation and to generate the laser beam stably.

However, a vacuum pump that intakes a medium gas, for example, is connected to the exhaust line. The medium gas includes dirt (dust generated in association with the operation of the oscillating portion and oil used in the blower and the like, and dirt accumulates inside the vacuum pump as the use time of the vacuum pump extends.

The use of a dry pump (an oil-less pump) as a vacuum pump is useful in that the dry pump can suppress vapor, oil, or the like resulting from the pump from entering into a medium gas as compared to a rotary pump (a wet pump or an oil-sealed rotary pump). On the other hand, since the dry pump does not require periodic maintenance such as replacement of a lubricant or a filter unlike a rotary pump (a wet pump), there is generally no chance to discharge the accumulated dirt.

Moreover, the dry pump is relatively more expensive than the rotary pump, and there is a demand to use the dry pump as long as possible. However, since there is no chance to discharge the accumulated dirt, when the exhaust performance or the reliability of the dry pump decreases, it is necessary to replace the dry pump itself despite the demand. Therefore, it is desirable if the exhaust performance of the dry pump can be recovered easily so that the dry pump can be used for a long period.

An object of the present invention is to provide a laser machining device capable of recovering an exhaust performance of a dry pump easily.

(1) The present invention relates to a laser machining device (for example, a laser machining device 1 to be described later) including: an oscillating portion (for example, an oscillating portion 10 to be described later) that generates a machining laser beam (for example, a laser beam G to be described later); an enclosure portion (for example, an enclosure portion 20 to be described later) in which a first gas (for example, a first gas M to be described later) is enclosed; and an exhausting portion (for example, an exhausting portion 60 to be described later) that exhausts the first gas together with a dirt generated in the enclosure portion in association with an operation of the oscillating portion, wherein the exhausting portion includes: a dry pump (for example, a dry pump 61 to be described later); a first line (for example, a first line 63 to be described later) that connects the enclosure portion and the dry pump; a second line (for example, a second line 64 to be described later) that supplies a second gas (for example, a second gas N to be described later) having a higher pressure than the first gas to the dry pump; a valve portion (for example, a valve portion 70 to be described later) that opens or closes the first line and the second line; and a control unit (for example, a control unit 90 to be described later) that controls opening or closing of the valve portion.

(2) In the laser machining device according to (1), it is preferable that the second line is connected to an intermediate portion of the first line, the valve portion is a three-way valve (for example, a valve 71 to be described later) disposed in a connection portion to which the first line and the second line are connected, and the control unit controls the three-way valve so that the valve switches from a first inflow state in which the first gas flows from the first line to the dry pump to a second inflow state in which the second gas flows from the second line to the dry pump, and the second inflow state switches to the first inflow state after the elapse of a predetermined period.

(3) In the laser machining device according to (1), it is preferable that the valve portion includes: a first stop valve (for example, a first stop valve 72 to be described later) that opens or closes the first line; and a second stop valve (for example, a second stop valve 73 to be described later) that opens or closes the second line, and the control unit opens the first stop valve and the second stop valve to supply the first gas and the second gas to the dry pump from the first line and the second line, respectively, and closes the second stop valve after the elapse of a predetermined period.

(4) In the laser machining device according to (3), it is preferable that the second line is connected to the enclosure portion.

(5) In the laser machining device according to any one of (1) to (4), it is preferable that the control unit opens or closes the valve portion on the basis of a predetermined opening/closing timing.

(6) In the laser machining device according to (5), it is preferable that the control unit opens or closes the valve portion on the basis of a time elapsed from a previous opening/closing operation of the valve portion.

(7) In the laser machining device according to (5) or (6), it is preferable that the control unit opens or closes the valve portion on the basis of a cumulative period from the start of an operation of the oscillating portion.

(8) In the laser machining device according to any one of (5) to (7), it is preferable that the control unit opens or closes the valve portion before the start of an operation of the oscillating portion or after the operation stops.

(9) In the laser machining device according to any one of (1) to (8), it is preferable that the laser machining device further includes a pressure measurement portion (for example, pressure measurement portion 80 to be described later) that measures the pressure of the first gas inside the enclosure portion, and the control unit opens or closes the valve portion on the basis of whether the measured pressure satisfies a predetermined reference pressure.

(10) In the laser machining device according to (9), it is preferable that the control unit sets an opening period of the second line on the basis of a difference between the measured pressure and the reference pressure.

According to the present invention, it is possible to provide a laser machining device capable of recovering an exhaust performance of a dry pump easily.

DETAILED DESCRIPTION OF THE INVENTION

Hereinafter, laser machining devices according to first to sixth embodiments of the present invention will be described with reference to FIGS. 1 to 15.

First Embodiment

Figure 1:
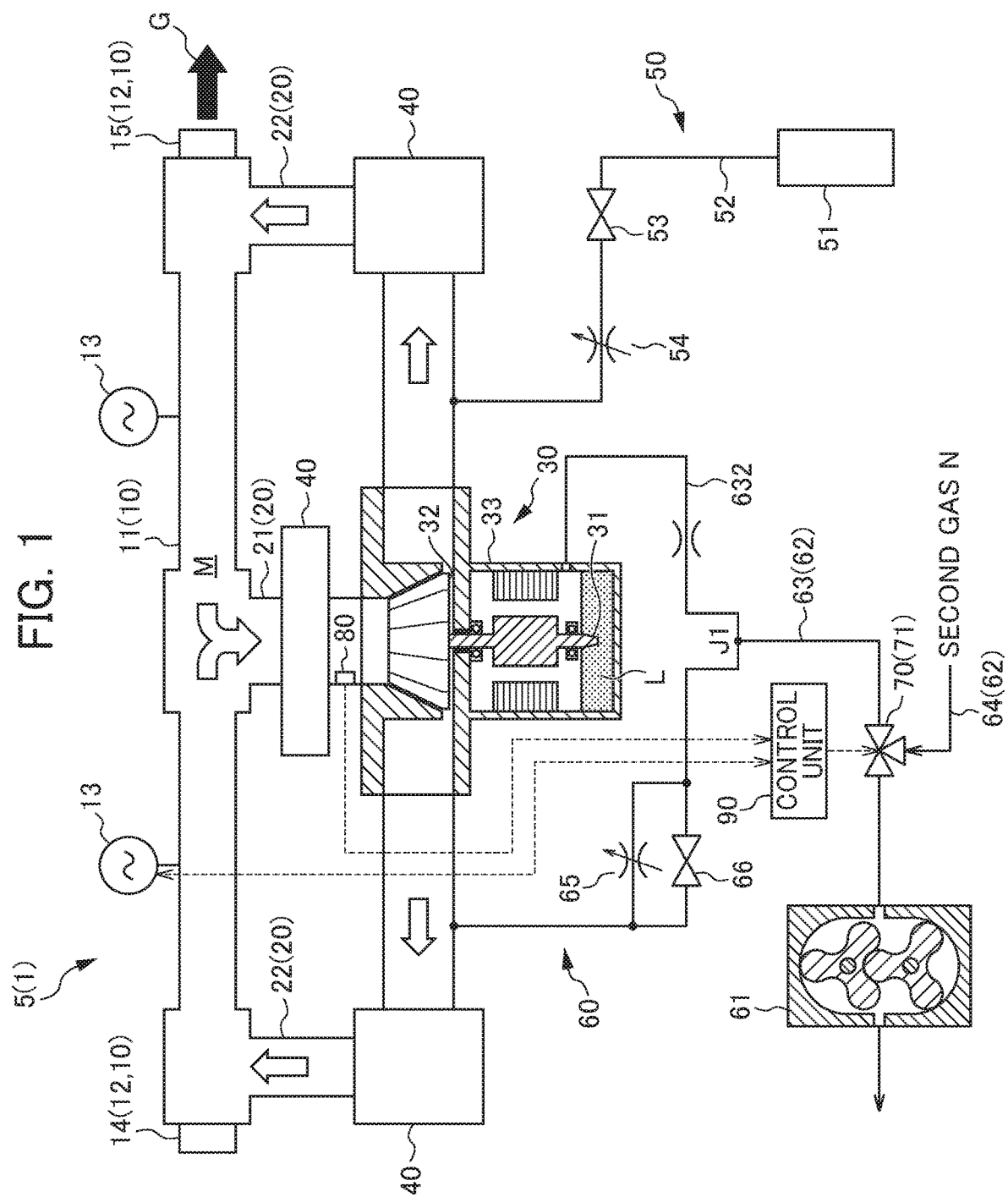
FIG. 1 is a schematic diagram illustrating a laser machining device according to a first embodiment of the present invention.
Figure 2:
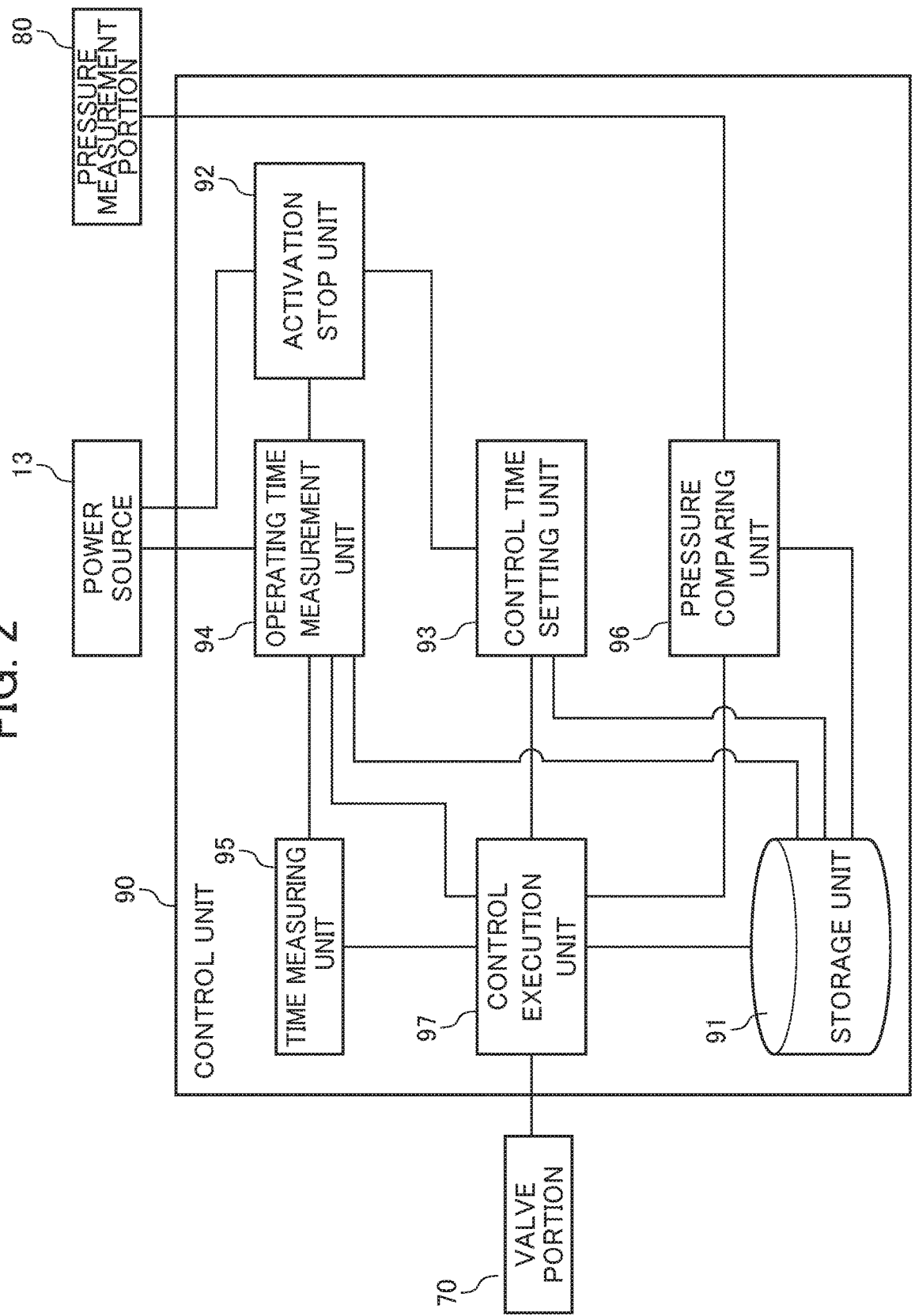
FIG. 2 is a block diagram illustrating a control unit of the laser machining device of the first embodiment.
Figure 3:
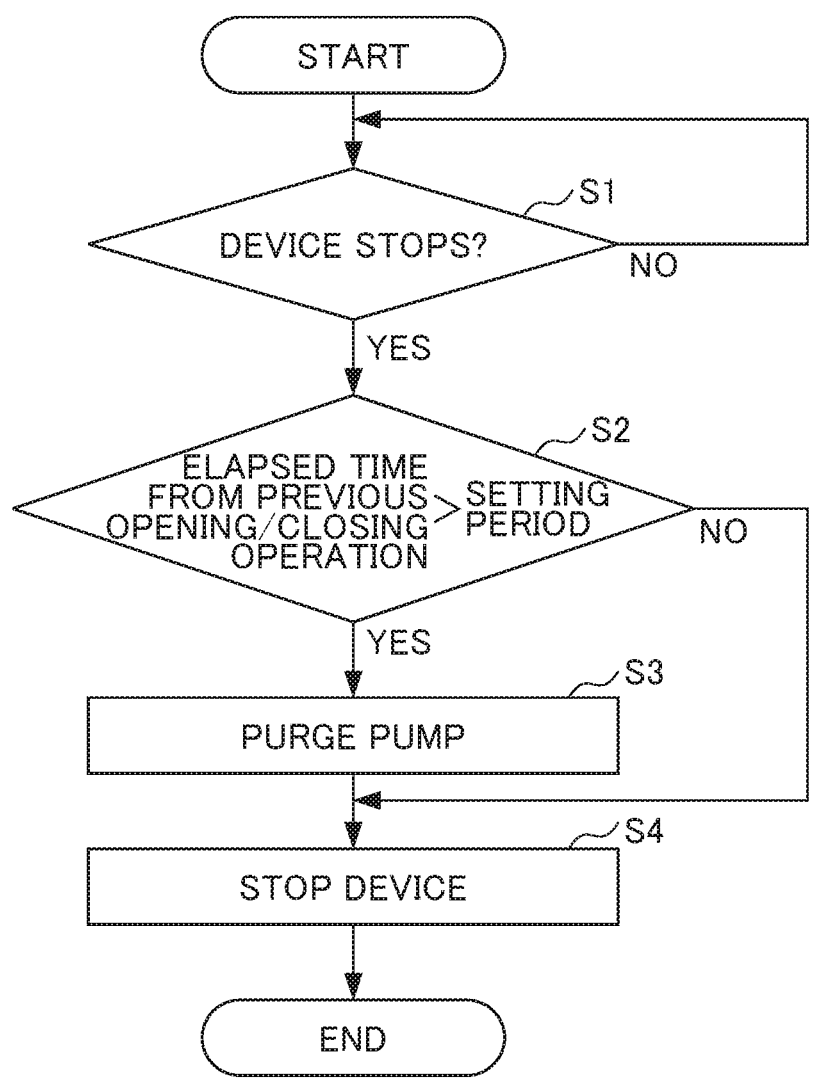
FIG. 3 is a flowchart illustrating an operation of purging a dry pump on the basis of the time elapsed from a previous opening or closing operation before the laser machining device of the first embodiment stops.
Figure 4:
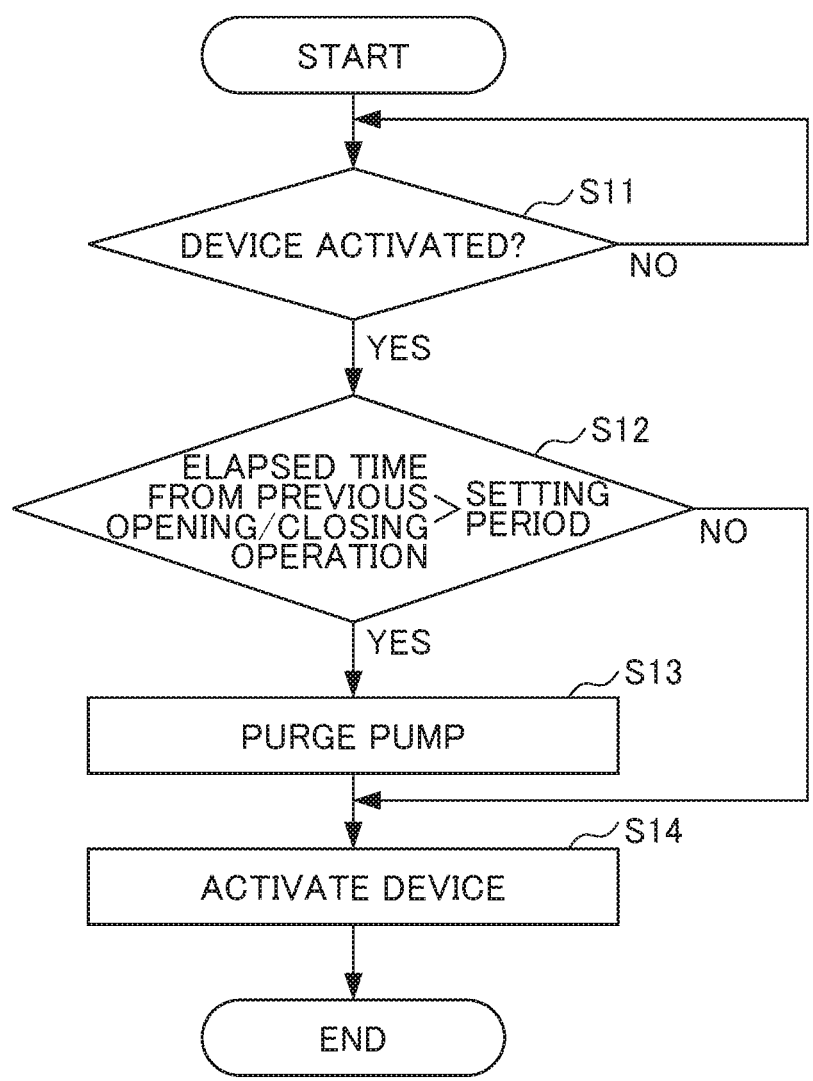
FIG. 4 is a flowchart illustrating an operation of purging a dry pump on the basis of the time elapsed from a previous opening or closing operation before an oscillating portion of the laser machining device of the first embodiment is activated.
Figure 5:
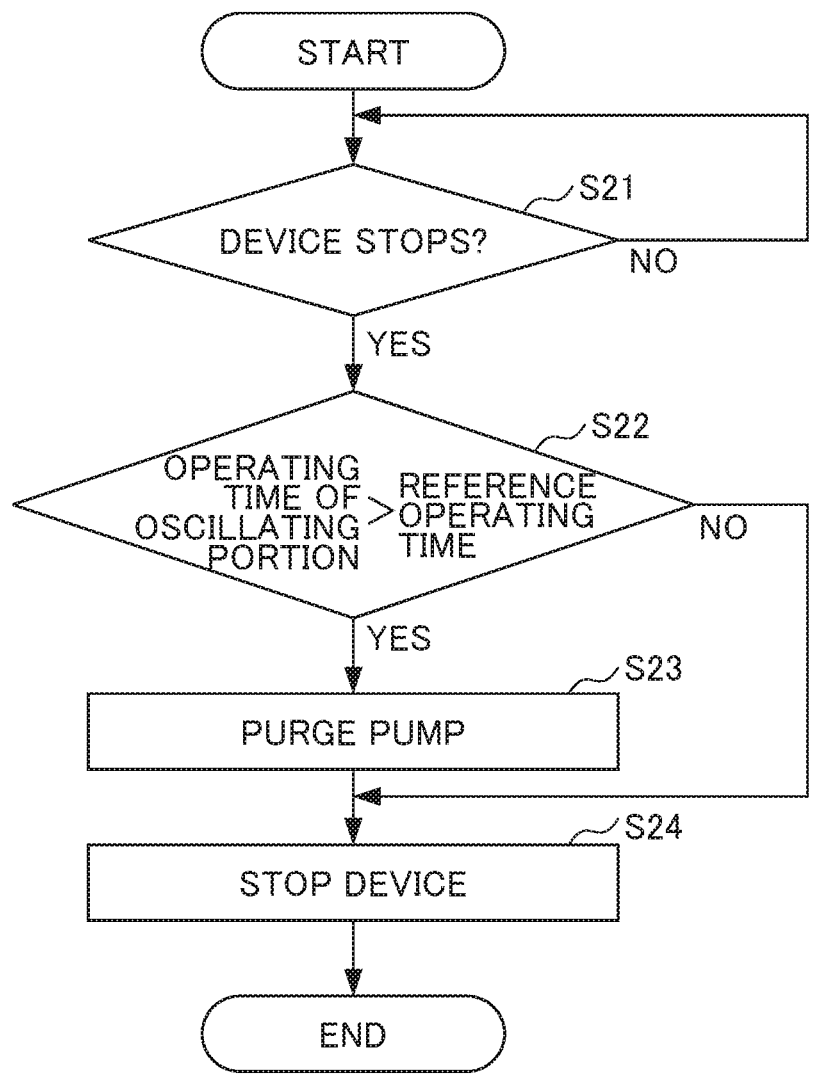
FIG. 5 is a flowchart illustrating an operation of purging a dry pump on the basis of an operating time of the oscillating portion before the laser machining device of the first embodiment stops.

First, a laser machining device according to a first embodiment of the present invention will be described with reference to FIGS. 1 to 10. FIG. 1 is a schematic diagram illustrating a laser machining device according to the first embodiment of the present invention. FIG. 2 is a block diagram illustrating a control unit of a laser machining device of the first embodiment. FIG. 3 is a flowchart illustrating an operation of purging a dry pump on the basis of the time elapsed from a previous opening or closing operation before the laser machining device of the first embodiment stops. FIG. 4 is a flowchart illustrating an operation of purging a dry pump on the basis of the time elapsed from a previous opening or closing operation before an oscillating portion of the laser machining device of the first embodiment is activated. FIG. 5 is a flowchart illustrating an operation of purging a dry pump on the basis of an operating time of the oscillating portion before the laser machining device of the first embodiment stops.

Figure 6:
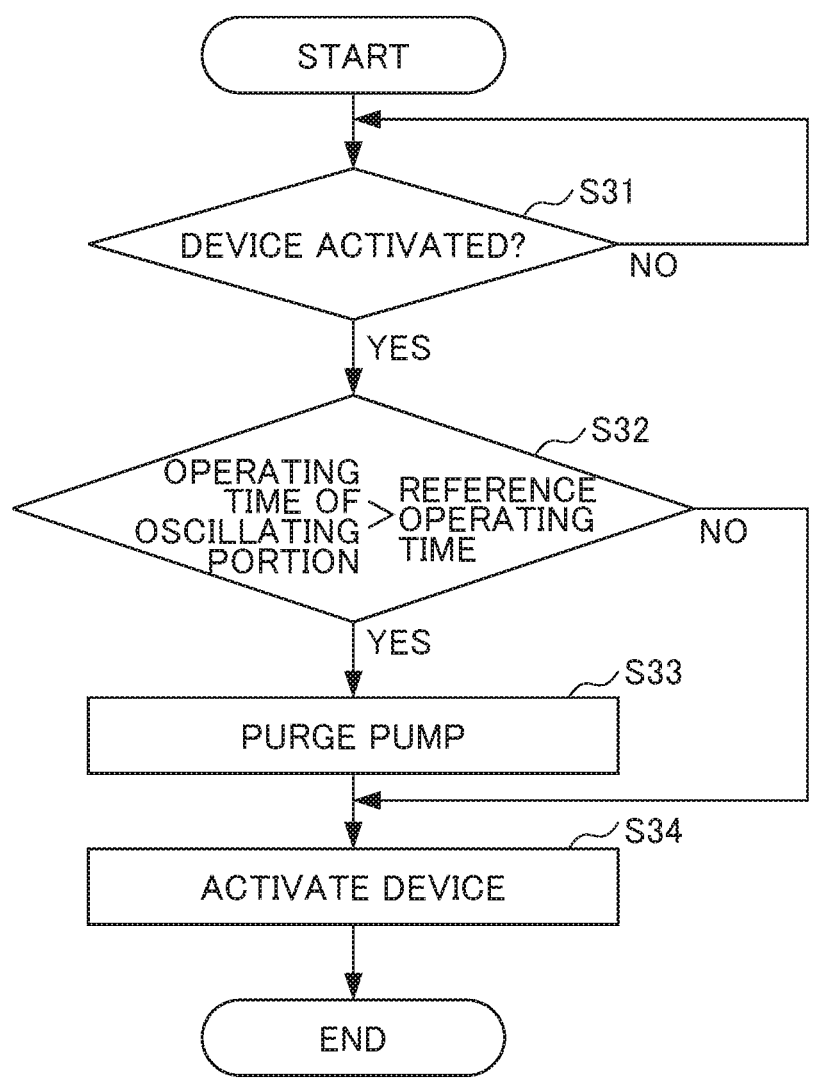
FIG. 6 is a flowchart illustrating an operation of purging a dry pump on the basis of an operating time of the oscillating portion before the oscillating portion of the laser machining device of the first embodiment is activated.
Figure 7:
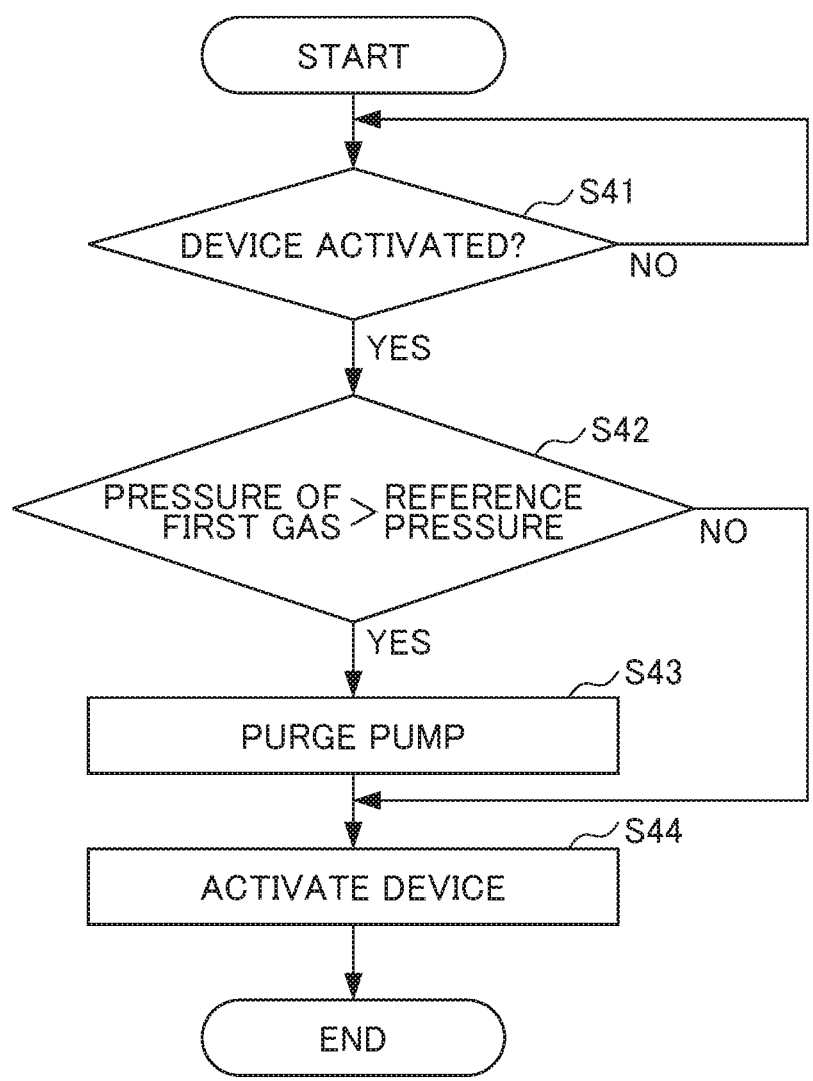
FIG. 7 is a flowchart illustrating an operation of purging a dry pump when the pressure of a first gas is higher than a reference pressure before the oscillating portion of the laser machining device of the first embodiment is activated.
Figure 8:
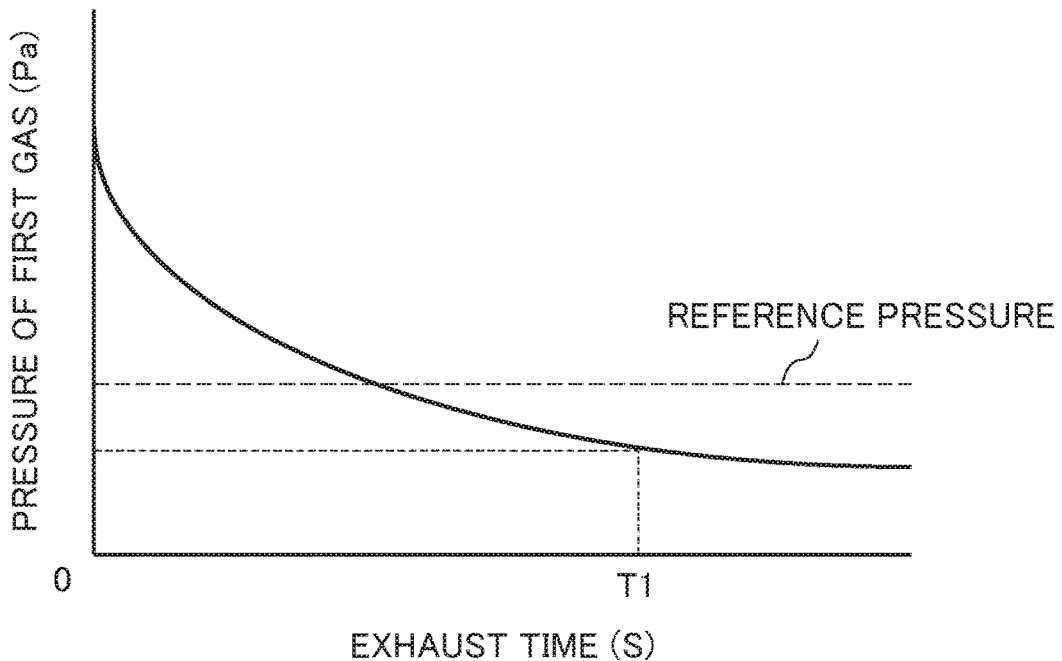
FIG. 8 is a first graph illustrating a difference between the pressure of a first gas and a reference pressure.
Figure 9:
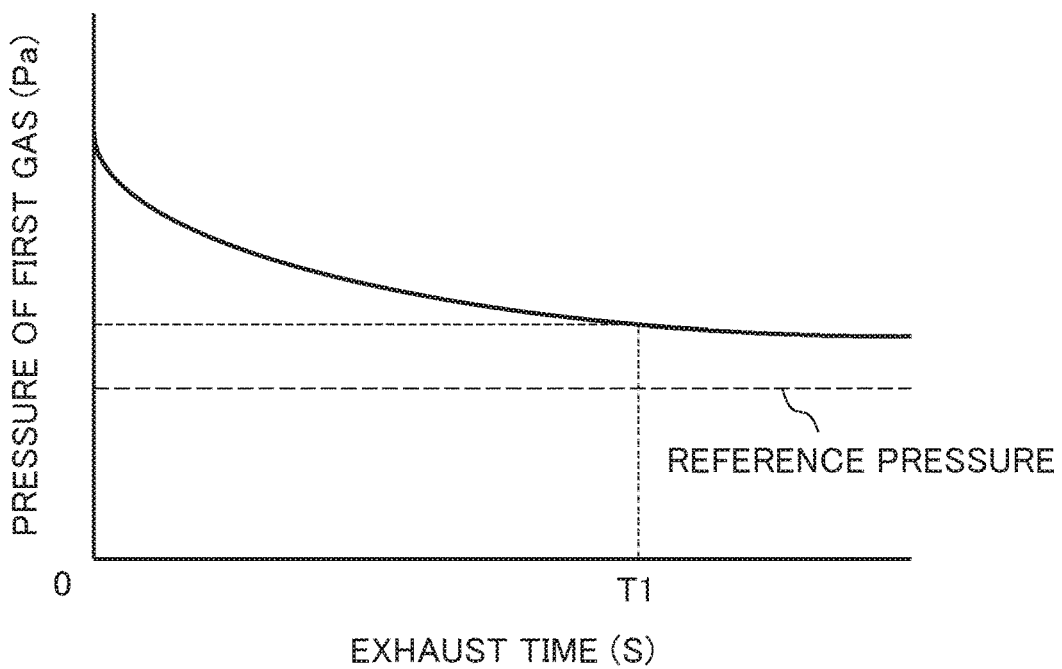
FIG. 9 is a second graph illustrating a difference between the pressure of a first gas and a reference pressure.
Figure 10:
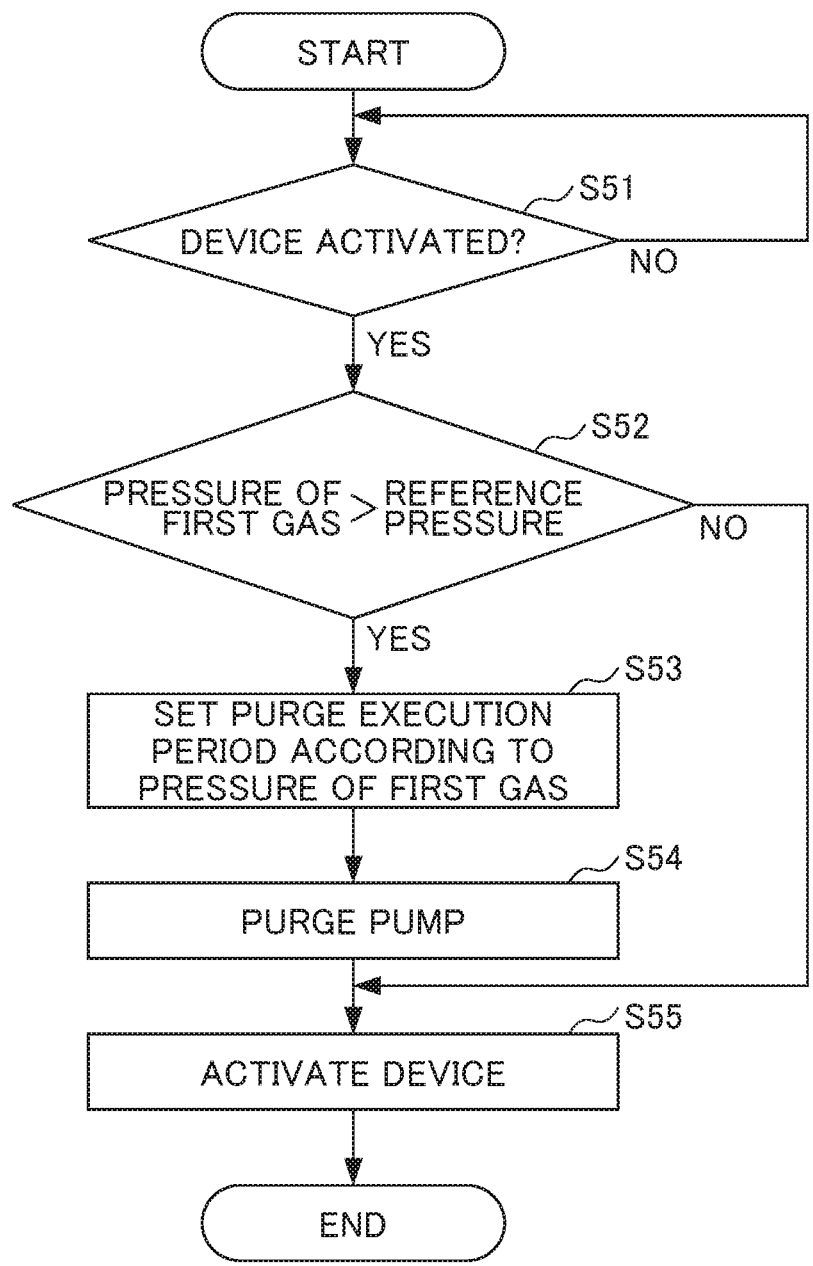
FIG. 10 is a flowchart illustrating an operation of setting a purge execution period of a dry pump on the basis of a difference between the pressure of a first gas and a reference pressure before the oscillating portion of the laser machining device of the first embodiment is activated.

FIG. 6 is a flowchart illustrating an operation of purging a dry pump on the basis of an operating time of the oscillating portion before the oscillating portion of the laser machining device of the first embodiment is activated. FIG. 7 is a flowchart illustrating an operation of purging a dry pump when the pressure of a first gas is higher than a reference pressure before the oscillating portion of the laser machining device of the first embodiment is activated. FIG. 8 is a first graph illustrating a difference between the pressure of a first gas and a reference pressure. FIG. 9 is a second graph illustrating a difference between the pressure of a first gas and a reference pressure. FIG. 10 is a flowchart illustrating an operation of setting a purge execution period of a dry pump on the basis of a difference between the pressure of a first gas and a reference pressure before the oscillating portion of the laser machining device of the first embodiment is activated.

A laser machining device 1 according to the present embodiment is a laser oscillator 5 that excites a medium gas to generate a laser beam G. As illustrated in FIG. 1, the laser machining device 1 includes an oscillating portion 10, an enclosure portion 20, a blower 30, a heat exchanger 40, a supply portion 50, an exhausting portion 60, a valve portion 70, a pressure measurement portion 80, and a control unit 90.

The oscillating portion 10 generates a machining laser beam G for machining a machining work (not illustrated).

The oscillating portion 10 includes an excitation portion 11 and an optical resonance portion 12.

The excitation portion 11 is formed as a discharge tube having a pair of electrodes (not illustrated) connected to a pair of power source 13. An optical resonance portion 12 is provided at both ends in an axial direction of the excitation portion 11. A medium gas (hereinafter referred to as a first gas M) is enclosed in the excitation portion 11.

The optical resonance portion 12 includes a rear mirror 14 (a total reflection mirror or a partial transmission mirror) and an output mirror 15 (a partial transmission mirror). The rear mirror 14 is provided at one end on the opposite side (the left side in FIG. 1) of an emitting direction (the right side in FIG. 1) of the laser beam G, of the excitation portion 11. The output mirror 15 is provided at one end in the emitting direction of the laser beam G, of the excitation portion 11.

In the oscillating portion 10 described above, an AC voltage is applied from the pair of power source 13 to the pair of electrodes. In this way, a discharge occurs between the pair of electrodes. The first gas M is excited by the discharge. Light radiated from the first gas M is amplified by resonance of the optical resonance portion 12. The laser beam G exits from the output mirror 15.

The enclosure portion 20 causes the first gas M to circulate between the oscillating portion 10 and the enclosure portion 20. That is, the first gas M is enclosed in the enclosure portion 20. The enclosure portion 20 includes one lead-out line 21 and a pair of lead-in lines 22.

One end of the lead-out line 21 is connected to an intermediate portion in the axial direction of the discharge tube that forms the excitation portion 11. Specifically, the lead-out line 21 is formed as a tube extending in a radial direction of the discharge tube from an intermediate portion of the discharge tube.

One set of ends of the pair of lead-in lines 22 are connected to both ends in the axial direction of the discharge tube. In the present embodiment, the pair of lead-in lines 22 are formed in an L-shape or an approximately L-shape and are disposed so that the other ends thereof face each other. The "L-shape" or "approximately L-shape" mentioned herein may be a generally bent shape.

The blower 30 has a configuration of a direct drive-type turbo fan, for example. The blower 30 is disposed between the other end of the lead-out line 21 and the other set of ends of the pair of lead-in lines 22. The blower 30 has a shaft portion 31 extending in a longitudinal direction of the lead-out line 21, an impeller 32 attached to a distal end of the shaft portion 31, and a motor portion 33 that rotates the shaft portion 31 and the impeller 32. Since the blower 30 has an oil reservoir which is provided in the motor portion 33 so as to store a lubricant L, the blower 30 can supply the lubricant L to the shaft portion 31 stably.

According to the enclosure portion 20 and the blower 30 described above, the shaft portion 31 and the impeller 32 rotate around the shaft center on the basis of driving of the motor portion 33. When the impeller 32 rotates, the first gas M present in the intermediate portion of the discharge tube is supplied to the lead-out line 21 and flows toward the blower 30. The first gas M having reached the blower 30 branches into the pair of lead-in lines 22 by the impeller 32 and flows into both ends of the discharge tube through the pair of lead-in lines 22.

The heat exchanger 40 has a multiplate-type configuration. The heat exchanger 40 is disposed individually in one lead-out line 21 and the lead-in lines 22. That is, in the present embodiment, three heat exchangers 40 are disposed.

The heat exchanger 40 cools the first gas M that passes through one lead-out line 21 and the lead-in lines 22.

The supply portion 50 supplies the first gas M to the enclosure portion 20. The supply portion 50 includes a gas cylinder 51 and a supply line 52.

The gas cylinder 51 encloses the first gas M. The supply line 52 is a tube. The supply line 52 is configured to be able to supply the first gas M supplied from the gas cylinder 51 to the enclosure portion 20. That is, one end of the supply line 52 is connected to the gas cylinder 51. The other end of the supply line 52 is connected to the enclosure portion 20. Specifically, one end of the supply line 52 is connected to the gas cylinder 51. The other end of the supply line 52 is connected one lead-out line 21. A stop valve and a flow rate control valve 54 are provided in the supply line 52. The stop valve 53 and the flow rate control valve 54 can adjust the flow rate of the first gas M to be supplied.

The exhausting portion 60 exhausts the first gas M enclosed in the enclosure portion 20. Specifically, the exhausting portion 60 exhausts the first gas M together with dirt generated in the enclosure portion 20 in association with the operation of the oscillating portion 10. The exhausting portion 60 exhausts the first gas M from the enclosure portion 20 together with a dust entering during maintenance of the oscillating portion 10 and the enclosure portion 20, fine particles generated due to wearing of the oscillating portion 10 and the enclosure portion 20, and the lubricant L of the blower 30 as the dirt, for example. The exhausting portion 60 includes a dry pump 61 and an exhaust line 62.

The dry pump 61 exhausts the first gas M from the enclosure portion 20 by sucking the first gas M enclosed in the enclosure portion 20. The dry pump 61 sucks the first gas M together with the dirt present in the enclosure portion 20. Moreover, the dry pump 61 is configured to be able to purge the inside thereof by sucking a second gas N having a higher pressure than the first gas M (this purging operation will be described later).

The exhaust line 62 is a tube. The exhaust line 62 is configured to be able to supply the first gas M and the second gas N to the dry pump 61. The exhaust line 62 includes a first line 63 and a second line 64.

The first line 63 connects the dry pump 61 and the enclosure portion 20. That is, one end of the first line 63 is connected to the dry pump 61. The other end of the first line 63 is connected to the enclosure portion 20. Specifically, one end of the first line 63 is connected to the dry pump 61. The other end of the first line 63 is connected to the other lead-in line 22. Moreover, the first line 63 branches at the intermediate portion and is connected to the motor portion 33 in order to exhaust the first gas M inside the motor portion 33. The branched line is depicted as a first branch line 632. A flow rate adjustment valve 65 and a stop valve 66 for adjusting the pressure of the first gas M enclosed in the enclosure portion 20 are disposed in parallel between the enclosure portion 20 and the branch position J1 of the first line 63.

The second line 64 is connected to an intermediate portion of the first line 63. Specifically, the second line 64 is connected between the dry pump 61 and the branch position J1 of the first line 63. The second line 64 supplies the second gas N having a higher pressure than the first gas M to the dry pump 61.

The valve portion 70 is a valve that opens and closes the first line 63 and the second line 64. In the present embodiment, the valve portion 70 is a three-way valve 71 and is disposed in a connection portion to which the first line 63 and the second line 64 are connected. The valve portion 70 is configured to be able to switch between a first inflow state in which the first gas M flows from the first line 63 to the dry pump 61 and a second inflow state in which the second gas N flows from the second line 64 to the dry pump 61.

The pressure measurement portion 80 is a pressure sensor that measures the pressure of the first gas M inside the enclosure portion 20. The pressure measurement portion 80 is disposed in an intermediate portion of one lead-in line 22.

The control unit 90 is a controller that controls opening or closing of the valve portion 70. The control unit 90 controls purging of the dry pump 61 by opening or closing the valve portion 70. Specifically, the control unit 90 controls purging of the dry pump 61 by opening or closing the valve portion 70 on the basis of a predetermined opening or closing timing. Particularly, the control unit 90 controls the valve portion 70 before the operation of the oscillating portion 10 starts or after the operation of the oscillating portion 10 stops. Moreover, the control unit 90 controls activation and stopping of the oscillating portion 10. As illustrated in FIG. 2, the control unit 90 includes a storage unit 91, an activation stop unit 92, a time measuring unit 95, a control time setting unit 93, an operating time measurement unit 94, a pressure comparing unit 96, and a control execution unit 97.

The storage unit 91 stores a previous time point at which an opening or closing operation of the valve portion 70 was performed. Moreover, the storage unit 91 stores a cumulative period from the start of operation of the oscillating portion 10. Specifically, the storage unit 91 stores a cumulative period in which the oscillating portion 10 was operated actually from a previous time point at which an opening or closing operation of the valve portion 70 was performed. Moreover, the storage unit 91 stores a reference elapsed time at which the dry pump 61 is purged and a reference pressure of the first gas M at which the dry pump 61 is purged.

The activation stop unit 92 activates or stops the laser machining device 1. Moreover, after the laser machining device 1 is activated, the activation stop unit 92 activates the power source 13 (the oscillating portion 10) to create a state in which the laser beam G can be emitted from the oscillating portion 10. The activation stop unit 92 is connected to a mechanical switch (not illustrated), for example, and activates or stops the laser machining device 1 on the basis of an input to the switch (not illustrated). Specifically, when the laser machining device 1 is activated, the activation stop unit 92 activates the supply portion 50 and the exhausting portion 60 on the basis of the input to the switch (not illustrated) (this state is a standby state and will be referred to as a first state). The activation stop unit 92 activates the blower 30 on the basis of another input to the switch (not illustrated) and then activates the power source 13 (the oscillating portion 10). In this way, the activation stop unit 92 puts the laser machining device 1 into a state in which the laser machining device 1 can emit the laser beam G (this state is an operating state and will be referred to as a second state).

When the laser machining device 1 is stopped, the activation stop unit 92 stops the power source 13 (the oscillating portion 10) and the blower 30 on the basis of the input to the switch (not illustrated) (this state is a standby state and will be referred to as a third state). The activation stop unit 92 stops the supply portion 50 and the exhausting portion 60 on the basis of the input to the switch (not illustrated) (this state is a stop state and will be referred to as a fourth state). When the laser machining device 1 is activated or stopped to create the first state or the third state, the activation stop unit 92 transmits an activation signal or a stop signal to the control time setting unit 93, the operating time measurement unit 94, and the pressure comparing unit 96. Moreover, when the oscillating portion 10 is activated (when the second state is created), the activation stop unit 92 transmits an activation signal to the operating time measurement unit 94.

The time measuring unit 95 is a so-called timer and measures a present time. The control time setting unit 93 acquires an activation signal or a stop signal from the activation stop unit 92. Upon acquiring the activation signal or the stop signal, the control time setting unit 93 acquires a reference elapsed time from the storage unit 91. Moreover, the control time setting unit 93 acquires the previous time point at which an opening or closing operation of the valve portion 70 was performed from the storage unit 91. The control time setting unit 93 adds a reference elapsed time to the previous time point at which the opening or closing operation of the valve portion 70 was performed. When the addition result exceeds the present time point acquired from the time measuring unit 95, the control time setting unit 93 transmits a purge execution signal to the control execution unit 97.

The operating time measurement unit 94 acquires an activation signal, a stop signal, or an operation signal from the activation stop unit 92. Upon acquiring the activation signal, the operating time measurement unit 94 acquires a cumulative period from the start of the operation of the oscillating portion 10 from the storage unit 91. Moreover, the operating time measurement unit 94 acquires the reference operating time of the oscillating portion 10 from the storage unit 91. When the acquired cumulative period exceeds the reference operating time of the oscillating portion 10, the operating time measurement unit 94 transmits a purge execution signal to the control execution unit 97. When the purge execution signal is transmitted, the operating time measurement unit 94 resets the cumulative period and stores the reset cumulative period in the storage unit 91. Moreover, the operating time measurement unit 94 acquires a time point at which the operation signal was acquired from the time measuring unit 95.

Upon acquiring the stop signal, the operating time measurement unit 94 acquires a time point at which the stop signal was acquired from the time measuring unit 95. The operating time measurement unit 94 acquires a cumulative period from the start of operation of the oscillating portion 10 from the storage unit 91. Moreover, the operating time measurement unit 94 acquires a reference operating time of the oscillating portion 10 from the storage unit 91. The operating time measurement unit 94 adds a period elapsed until the stop signal was acquired after the operation signal was acquired to the acquired cumulative period. When the added cumulative period exceeds the reference operating time of the oscillating portion 10, the operating time measurement unit 94 transmits a purge execution signal to the control execution unit 97. When the purge execution signal is transmitted, the operating time measurement unit 94 resets the cumulative period and stores the reset cumulative period in the storage unit 91.

The pressure comparing unit 96 acquires the activation signal from the activation stop unit 92. Upon acquiring the activation signal, the pressure comparing unit 96 acquires the reference pressure of the first gas M from the storage unit 91. The pressure comparing unit 96 acquires the pressure measured by the pressure measurement portion 80 after a predetermined period has elapsed. The pressure comparing unit 96 compares the reference pressure and the pressure measured by the pressure measurement portion 80. When the pressure measured by the pressure measurement portion 80 is higher than the reference pressure, the pressure comparing unit 96 transmits a purge execution signal to the control execution unit 97. Moreover, the pressure comparing unit 96 opens the second line 64 and sets a purge execution period of the dry pump 61 on the basis of the difference between the measured pressure and the reference pressure. The pressure comparing unit 96 transmits a purge execution signal for the dry pump 61 to the control execution unit 97. Moreover, the pressure comparing unit 96 transmits the set period to the control execution unit 97.

The control execution unit 97 opens and closes the valve portion 70 to purge the dry pump 61. The control execution unit 97 performs purging the dry pump 61 in a standby state of the laser machining device 1. Specifically, the control execution unit 97 performs purging the dry pump 61 when a purge execution signal is acquired from the operating time measurement unit 94, the operating time setting unit, or the pressure comparing unit 96. Moreover, when the purge execution period is acquired from the pressure comparing unit 96, the control execution unit 97 opens the second line 64 for the set purge execution period and purges the dry pump 61 using the second gas N. In the present embodiment, the control unit 90 opens the second line 64 and purges the dry pump 61 using the second gas N by switching the three-way valve 71 which is the valve portion 70.

Next, a purging operation of the laser machining device 1 will be described. Purging of the dry pump 61 in the laser machining device 1 is performed on the basis of a purge execution signal transmitted from at least one of the control time setting unit 93, the operating time measurement unit 94, and the pressure comparing unit 96. Moreover, purging of the dry pump 61 is performed in the first state or the third state (the standby state). Hereinafter, purging of the dry pump 61 in the laser machining device 1 will be described.

First, with reference to FIG. 3, an operation of purging the dry pump 61 on the basis of an elapsed period from a previous opening or closing operation before the laser machining device 1 stops (the third state) will be described.

First, in step S1, in a period in which the oscillating portion 10 is operating, the activation stop unit 92 determines whether an operation of stopping the operation of the oscillating portion 10 is input to the switch (not illustrated). When the switch (not illustrated) is not operated (step S1: NO), the activation stop unit 92 waits until the switch (not illustrated) is operated. On the other hand, when the switch (not illustrated) is operated (step S1: YES), the activation stop unit 92 transmits a stop signal to the control time setting unit 93. Moreover, the activation stop unit 92 stops the power source 13 to cause the laser machining device 1 to transition from the second state to the third state and the process proceeds to step S2.

In step S2, upon acquiring the stop signal, the control time setting unit 93 acquires a present time point from the time measuring unit 95. Moreover, the control time setting unit 93 acquires the previous time point at which the opening or closing operation of the valve portion 70 was performed and a reference elapsed time at which the dry pump 61 is purged from the storage unit 91. The control time setting unit 93 adds the reference elapsed time to the previous time point to calculate a control time. When the present time point exceeds the control time (step S2: YES), the control time setting unit 93 transmits a purge execution signal to the control execution unit 97 and the process proceeds to step S3. On the other hand, when the present time point does not exceed the control time, the control time setting unit 93 performs the process of step S4.

In step S3, the control execution unit 97 acquires a purge execution signal. The control execution unit 97 switches the three-way valve 71 from the first inflow state in which the first gas M flows from the first line 63 to the dry pump 61 to the second inflow state in which the second gas N flows from the second line 64 to the dry pump 61. The control execution unit 97 switches the three-way valve 71 to the first inflow state after a predetermined period (a period in which the dry pump 61 can be purged sufficiently) elapses. Moreover, the control execution unit 97 acquires the present time point from the time measuring unit 95, updates the previous time point at which the opening or closing operation of the valve portion 70 was performed to the present time point, and stores the updated time point in the storage unit 91.

In step S4, the activation stop unit 92 stops the operation of the supply portion 50 and the exhausting portion 60. That is, the activation stop unit 92 causes the laser machining device 1 to transition from the third state to the fourth state. In this way, the operation of the laser machining device 1 ends.

Next, an operation of purging the dry pump 61 on the basis of the elapsed time from the previous opening or closing operation before the oscillating portion 10 of the laser machining device 1 is activated (in the first state) will be described with reference to FIG. 4.

First, in step S11, the activation stop unit 92 determines whether an operation of activating the laser machining device 1 is performed on the switch (not illustrated). When the switch (not illustrated) is not operated (step S11: NO), the activation stop unit 92 waits until the switch (not illustrated) is operated. On the other hand, when the switch (not illustrated) is operated (step S11: YES), the activation stop unit 92 transmits an activation signal to the control time setting unit 93. Moreover, the activation stop unit 92 activates the supply portion 50 and the exhausting portion 60 to cause the laser machining device 1 to transition from the fourth state to the first state and the process proceeds to step S12.

In step S12, upon acquiring the activation signal, the control time setting unit 93 acquires the present time point from the time measuring unit 95. Moreover, the control time setting unit 93 acquires the previous time point at which the opening or closing operation of the valve portion 70 was performed and a reference elapsed time at which purging is performed from the storage unit 91. The control time setting unit 93 adds the reference elapsed time to the previous time point to calculate a control time. When the present time point exceeds the control time (step S12: YES), the control time setting unit 93 transmits a purge execution signal to the control execution unit 97 and the process proceeds to step S13. On the other hand, when the present time point does not exceed the control time, the control time setting unit 93 performs the process of step S14.

In step S13, the control execution unit 97 acquires a purge execution signal. The control execution unit 97 opens the stop valve disposed in the supply line 52. The control execution unit 97 switches the three-way valve 71 from the first inflow state in which the first gas M flows from the first line 63 to the dry pump 61 to the second inflow state in which the second gas N flows from the second line 64 to the dry pump 61. The control execution unit 97 switches the three-way valve 71 to the first inflow state after a predetermined period (a period in which the dry pump 61 can be purged sufficiently) elapses. Moreover, the control execution unit 97 acquires the present time point from the time measuring unit 95, updates the previous time point at which the opening or closing operation of the valve portion 70 was performed to the present time point, and stores the updated time point in the storage unit 91.

In step S14, the activation stop unit 92 activates the blower 30 and then activates the power source 13. That is, the activation stop unit 92 causes the laser machining device 1 to transition from the first state to the second state. In this way, the oscillating portion 10 is activated.

Next, an operation of purging the dry pump 61 on the basis of an operating time of the oscillating portion 10 before the laser machining device 1 stops (the third state) will be described with reference to FIG. 5.

First, in step S21, in a period in which the oscillating portion 10 is operating, the activation stop unit 92 determines whether an operation of stopping the operation of the oscillating portion 10 is performed on the switch (not illustrated). When the switch (not illustrated) is not operated (step S21: NO), the activation stop unit 92 waits until the switch (not illustrated) is operated. On the other hand, when the switch (not illustrated) is operated (step S21: YES), the activation stop unit 92 transmits a stop signal to the operating time measurement unit 94. Moreover, the activation stop unit 92 stops the power source 13 and the blower 30 to cause the laser machining device 1 to transition from the second state to the third state and the process proceeds to step S22.

In step S22, upon acquiring the stop signal, the operating time measurement unit 94 acquires the present time point from the time measuring unit 95. Moreover, the operating time measurement unit 94 acquires a time point (the time point at which the second state is created) at which the oscillating portion 10 was activated and a reference operating time at which purging is executed from the storage unit 91. The operating time measurement unit 94 acquires a cumulative period from the start of activation of the oscillating portion 10 from the storage unit 91. The operating time measurement unit 94 adds the present operating time of the oscillating portion 10 (the period elapsed from the second state to the third state) to the acquire cumulative period. The operating time measurement unit 94 compares the added cumulative period with the reference operating time. When the cumulative period exceeds the reference operating time (step S22: YES), the operating time measurement unit 94 transmits a purge execution signal to the control execution unit 97 and the process proceeds to step S23. Moreover, the operating time measurement unit 94 resets the cumulative period and stores the reset cumulative period in the storage unit 91. On the other hand, when the actual operating time does not exceed the reference operating time, the operating time measurement unit 94 performs the process of step S24. Moreover, the operating time measurement unit 94 updates the acquired cumulative period with the added cumulative period and stores the updated cumulative period in the storage unit 91.

In step S23, the control execution unit 97 acquires a purge execution signal. The control execution unit 97 switches the three-way valve 71 from the first inflow state in which the first gas M flows from the first line 63 to the dry pump 61 to the second inflow state in which the second gas N flows from the second line 64 to the dry pump 61. The control execution unit 97 switches the three-way valve 71 to the first inflow state after a predetermined period (a period in which the dry pump 61 can be purged sufficiently) elapses. Moreover, the control execution unit 97 acquires the present time point from the time measuring unit 95, updates the previous time point at which the opening or closing operation of the valve portion 70 was performed to the present time point, and stores the updated time point in the storage unit 91.

In step S24, the activation stop unit 92 stops the operation of the supply portion 50 and the exhausting portion 60. That is, the activation stop unit 92 causes the laser machining device 1 to transition from the third state to the fourth state. In this way, the operation of the laser machining device 1 ends.

Next, an operation of purging the dry pump 61 on the basis of the optical component of the oscillating portion 10 before the oscillating portion 10 of the laser machining device 1 is activated (in the first state) will be described with reference to FIG. 6.

First, in step S31, the activation stop unit 92 determines whether an operation of activating the laser machining device 1 is performed on the switch (not illustrated). When the switch (not illustrated) is not operated (step S31: NO), the activation stop unit 92 waits until the switch (not illustrated) is operated. On the other hand, when the switch (not illustrated) is operated (step S31: YES), the activation stop unit 92 transmits an activation signal to the control time measurement unit 94. Moreover, the activation stop unit 92 activates the supply portion 50 and the exhausting portion 60 to cause the laser machining device 1 to transition from the fourth state to the first state and the process proceeds to step S32.

In step S32, upon acquiring the activation signal, the operating time measurement unit 94 acquires the cumulative period of the operating time of the oscillating portion 10 from the storage unit 91. Moreover, the operating time measurement unit 94 acquires the reference operating time at which purging is executed from the storage unit 91. The operating time measurement unit 94 compares the acquired cumulative period with the reference operating time. When the cumulative period exceeds the reference operating time (step S32: YES), the operating time measurement unit 94 transmits a purge execution signal to the control execution unit 97 and the process proceeds to step S33. On the other hand, when the cumulative period does not exceed the reference operating time, the operating time measurement unit 94 performs the process of step S34.

In step S33, the control execution unit 97 acquires a purge execution signal. The control execution unit 97 switches the three-way valve 71 from the first inflow state in which the first gas M flows from the first line 63 to the dry pump 61 to the second inflow state in which the second gas N flows from the second line 64 to the dry pump 61. The control execution unit 97 switches the three-way valve 71 to the first inflow state after a predetermined period (a period in which the dry pump 61 can be purged sufficiently) elapses. Moreover, the control execution unit 97 acquires the present time point from the time measuring unit 95, updates the previous time point at which the opening or closing operation of the valve portion 70 was performed to the present time point, and stores the updated time point in the storage unit 91.

In step S34, the activation stop unit 92 activates the blower 30 and then puts the power source 13 into a bootable state. That is, the activation stop unit 92 causes the laser machining device 1 to transition from the first state to the second state. In this way, the oscillating portion 10 can be activated and the laser machining device 1 is activated.

Next, an operation of purging the dry pump 61 when the pressure of the first gas M is higher than the reference pressure before the oscillating portion 10 of the laser machining device 1 is activated (in the first state) will be described with reference to FIG. 7.

First, in step S41, the activation stop unit 92 determines whether an operation of activating the laser machining device 1 is performed on the switch (not illustrated). When the switch (not illustrated) is not operated (step S41: NO), the activation stop unit 92 waits until the switch (not illustrated) is operated. On the other hand, when the switch (not illustrated) is operated (step S41: YES), the activation stop unit 92 transmits an activation signal to the pressure comparing unit 96. Moreover, the activation stop unit 92 activates the supply portion 50 and the exhausting portion 60 to cause the laser machining device 1 to transition from the fourth state to the first state and the process proceeds to step S42.

In step S42, upon acquiring the activation signal, the pressure comparing unit 96 acquires the pressure of the first gas M from the pressure measurement portion 80 after a predetermined period elapses (for example, an exhaust time T1 (s) in FIGS. 8 and 9). Moreover, the pressure comparing unit 96 acquires the reference pressure at which purging is performed from the storage unit 91. The pressure comparing unit 96 compares the acquired pressure with the reference pressure. When the acquired pressure is higher than the reference pressure (step S42: YES, see FIG. 9), the pressure comparing unit 96 determines that the exhaust performance of the dry pump 61 has decreased and transmits a purge execution signal to the control execution unit 97, and the process proceeds to step S43. On the other hand, when the acquired pressure is lower than the reference pressure (see FIG. 8), the operating time measurement unit 94 determines that the exhaust performance of the dry pump 61 has not decreased and the process proceeds to step S44.

In step S43, the control execution unit 97 acquires a purge execution signal. The control execution unit 97 switches the three-way valve 71 from the first inflow state in which the first gas M flows from the first line 63 to the dry pump 61 to the second inflow state in which the second gas N flows from the second line 64 to the dry pump 61. The control execution unit 97 switches the three-way valve 71 to the first inflow state after a predetermined period (a period in which the dry pump 61 can be purged sufficiently) elapses. Moreover, the control execution unit 97 acquires the present time point from the time measuring unit 95, updates the previous time point at which the opening or closing operation of the valve portion 70 was performed to the present time point, and stores the updated time point in the storage unit 91.

In step S44, the activation stop unit 92 activates the blower 30 and then puts the power source 13 in a bootable state. That is, the activation stop unit 92 causes the laser machining device 1 to transition from the first state to the second state. In this way, the oscillating portion 10 can be activated and the laser machining device 1 is activated.

Next, an operation of setting a purge execution period of the dry pump 61 on the basis of a difference between the reference pressure and the pressure of the first gas M before the oscillating portion 10 of the laser machining device 1 is activated (in the first state) will be described with reference to FIG. 10. First, in step S51, the activation stop unit 92 determines whether an operation of activating the laser machining device 1 is performed on the switch (not illustrated). When the switch (not illustrated) is not operated (step S51: NO), the activation stop unit 92 waits until the switch (not illustrated) is operated. On the other hand, when the switch (not illustrated) is operated (step S51: YES), the activation stop unit 92 transmits an activation signal to the pressure comparing unit 96. Moreover, the activation stop unit 92 opens the stop valve 53 of the supply line 52 to activate the dry pump 61 to cause the laser machining device 1 to transition from the fourth state to the first state and the process proceeds to step S52.

In step S52, upon acquiring the activation signal, the pressure comparing unit 96 acquires the pressure of the first gas M from the pressure measurement portion 80 after a predetermined period elapses (for example, an exhaust time T1 (s) in FIGS. 8 and 9). Moreover, the pressure comparing unit 96 acquires the reference pressure at which purging is performed from the storage unit 91. The pressure comparing unit 96 compares the acquired pressure with the reference pressure. When the acquired pressure is higher than the reference pressure (step S42: YES, see FIG. 9), the pressure comparing unit 96 determines that the exhaust performance of the dry pump 61 has decreased and transmits a purge execution signal to the control execution unit 97. Moreover, the pressure comparing unit 96 sets a purge execution period on the basis of a difference between the acquire pressure and the reference pressure. Specifically, the pressure comparing unit 96 sets the purge execution period so that the larger the difference, the longer the period. Conversely, the pressure comparing unit 96 sets the purge execution period so that the smaller the difference, the shorter the period. The pressure comparing unit 96 transmits the set period to the control execution unit 97 and performs the process of step S43. On the other hand, when the acquired pressure is lower than the reference pressure (see FIG. 8), the pressure comparing unit 96 determines that the exhaust performance of the dry pump 61 has not decreased and the process proceeds to step S54.

In step S53, the control execution unit 97 acquires a purge execution signal. Moreover, the control execution unit 97 acquires a purge execution period. The control execution unit 97 switches the three-way valve 71 from the first inflow state in which the first gas M flows from the first line 63 to the dry pump 61 to the second inflow state in which the second gas N flows from the second line 64 to the dry pump 61. The control execution unit 97 switches the three-way valve 71 to the first inflow state after a predetermined period (a period in which the dry pump 61 can be purged sufficiently) elapses. Moreover, the control execution unit 97 acquires the present time point from the time measuring unit 95, updates the previous time point at which the opening or closing operation of the valve portion 70 was performed to the present time point, and stores the updated time point in the storage unit 91.

In step S54, the activation stop unit 92 activates the blower 30 and then puts the power source 13 in a bootable state. That is, the activation stop unit 92 causes the laser machining device 1 to transition from the first state to the second state. In this way, the oscillating portion 10 can be activated and the laser machining device 1 is activated.

According to the laser machining device 1 of the first embodiment of the present invention, the following advantages are obtained.

(1) The exhausting portion 60 includes the dry pump 61, the first line 63 that connects the enclosure portion 20 and the dry pump 61, the second line 64 that supplies the second gas N having a higher pressure than the first gas M to the dry pump 61, the valve portion 70 that opens and closes the first line 63 and the second line 64, and the control unit 90 that controls opening or closing of the valve portion 70. The control unit 90 can open and close the passages of the first line 63 and the second line 64 by operating the valve portion 70. In this way, the control unit 90 can control the flow of at least one of the first gas M and the second gas N into the dry pump 61. By causing the second gas N having a higher pressure than the first gas M to flow into the dry pump 61, it is possible to purge a dirt accumulated in the dry pump 61 as a result of exhausting the first gas M. Therefore, it is possible to recover the exhaust performance of the dry pump 61 easily and to suppress the occurrence of a problem in the dry pump 61.

(2) The second line 64 is connected to an intermediate portion of the first line 63. The valve portion 70 is the three-way valve 71 disposed in a connection portion to which the first line 63 and the second line 64 are connected. Moreover, the control unit 90 controls the three-way valve 71 so that the valve switches from a first inflow state in which the first gas M flows from the first line 63 to the dry pump 61 to a second inflow state in which the second gas N flows from the second line 64 to the dry pump 61, and the second inflow state switches to the first inflow state after the elapse of a predetermined period. Since the gas supplied to the dry pump 61 can be switched to any one of the first gas M and the second gas N, it is possible to purge the dry pump 61 using the second gas N only. In this way, since the first gas M including a dirt can be eliminated as compared to a case of performing purging using the first gas M as well, it is possible to improve the purging performance.

(3) The control unit 90 opens and closes the valve portion 70 on the basis of a predetermined opening or closing timing. Since the valve portion 70 is operated on the basis of a predetermined opening or closing timing, it is possible to suppress an unnecessary purging operation while suppressing accumulation of a dirt in the dry pump 61.

(4) The control unit 90 opens and closes the valve portion 70 on the basis of a cumulative period elapsed from a previous opening or closing operation of the valve portion 70. Since the dry pump 61 is purged every predetermined period from a previous purging operation of the dry pump 61, it is possible to maintain the exhaust performance of the dry pump 61 to a certain level.

(5) The control unit 90 opens and closes the valve portion 70 on the basis of the cumulative period from the start of the operation of the oscillating portion 10. Since the dry pump 61 can be purged at a timing at which it is expected that the amount of a dirt accumulated in the dry pump 61 exceeds a predetermined amount, it is possible to maintain the exhaust performance of the dry pump 61 to a certain level.

(6) The control unit 90 opens and closes the valve portion 70 before the start of the operation of the oscillating portion 10 or after the operation stops. Since the dry pump 61 is purged before the start of the operation of the oscillating portion 10 or after the operation stops, it is possible to purge the dry pump 61 without interrupting a machining operation. Therefore, it is possible to purge the dry pump 61 while suppressing a decrease in the processing efficiency resulting from purging being executed in the course of machining.

(7) The laser machining device 1 includes the pressure measurement portion 80 that measures the pressure of a gas inside the enclosure portion. The control unit 90 opens or closes the valve portion 70 on the basis of whether the measured pressure satisfies a predetermined reference pressure. It is possible to purge the dry pump 61 at a timing at which it is thought that the exhaust performance of the dry pump 61 has decreased. In this way, it is possible to recover the exhaust performance of the dry pump 61 and to reduce an influence on a machining operation.

(8) The control unit 90 sets an opening period of the second line 64 on the basis of the difference between the measured pressure and the reference pressure. Since the second line 64 is opened for a period determined on the basis of the difference between the measured pressure of the first gas M and the reference pressure, it is possible to optimize the period required for the purging operation and to minimize the downtime of the laser machining device 1.

Second Embodiment

Figure 11:
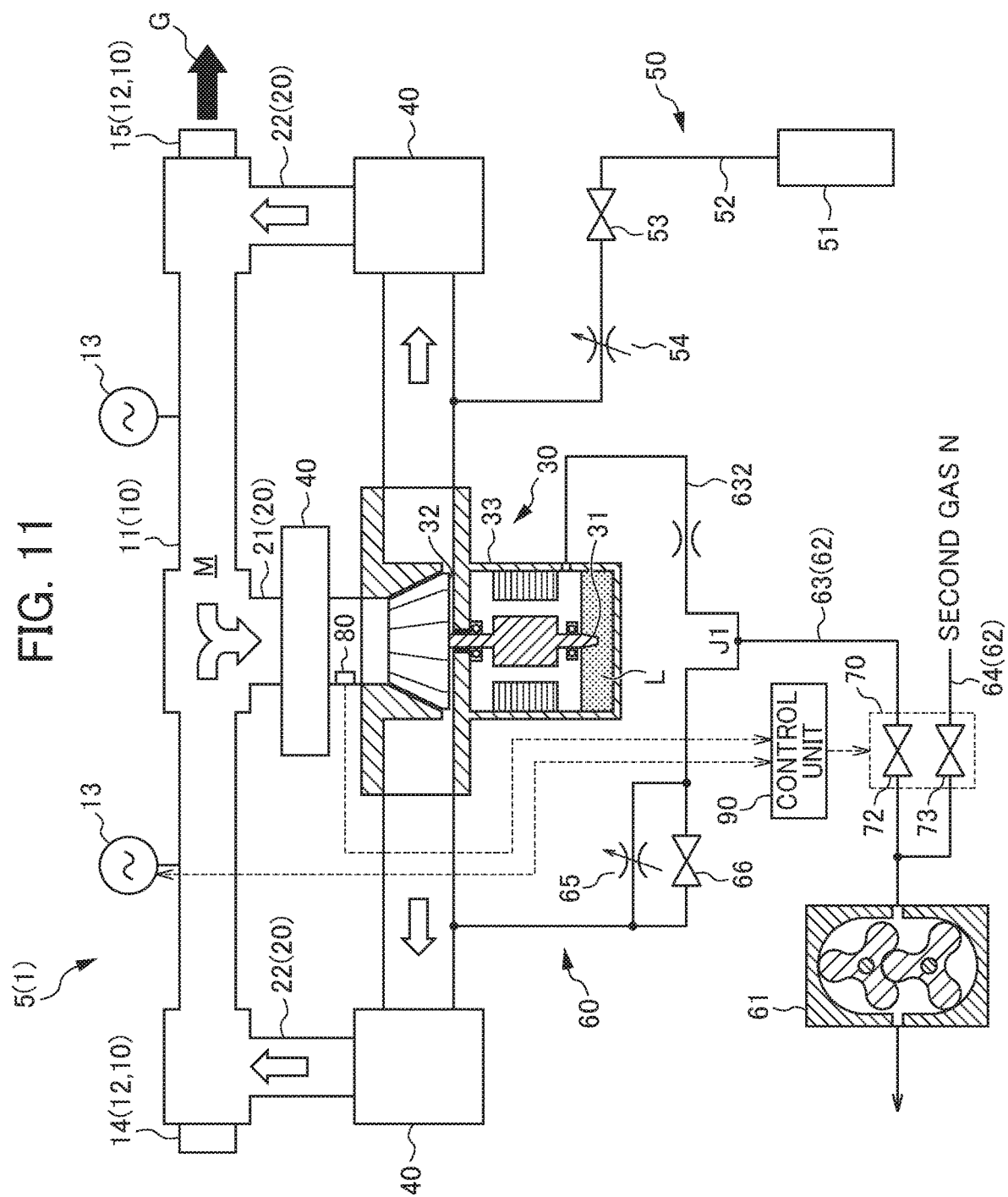
FIG. 11 is a schematic diagram illustrating a laser machining device according to a second embodiment of the present invention.

Next, a laser machining device according to a second embodiment of the present invention will be described with reference to FIG. 11. In the description of the second and subsequent embodiments, the same constituent elements will be denoted by the same reference numerals, and the description thereof will be omitted or simplified. FIG. 11 is a schematic diagram illustrating a laser machining device according to the second embodiment of the present invention. The laser machining device 1 according to the second embodiment is different from the first embodiment in that the valve portion 70 includes a first stop valve 72 that opens or closes the first line 63 and a second stop valve 73 that opens or closes the second line 64 as illustrated in FIG. 11. Moreover, in the laser machining device 1 according to the second embodiment, the operation of the control unit 90 (the control execution unit 97) that purges the dry pump 61 is different from that of the first embodiment. Specifically, the control unit 90 (the control execution unit 97) opens the first stop valve 72 and the second stop valve 73 to supply the first gas M and the second gas N to the dry pump 61 from the first line 63 and the second line 64, respectively, and closes the second stop valve 73 after the elapse of a predetermined period. Alternatively, the control unit 90 (the control execution unit 97) may open the second stop valve 73 to supply the second gas N from the second line 64 to the dry pump 61 and close the second stop valve 73 and open the first stop valve 72 after the elapse of a predetermined period.

According to the laser machining device 1 of the second embodiment of the present invention, the following advantages are obtained.

(9) The valve portion 70 includes the first stop valve 72 that opens or closes the first line 63 and the second stop valve 73 that opens or closes the second line 64. Moreover, the control unit 90 opens the first stop valve 72 and the second stop valve 73 to supply the first gas M and the second gas N to the dry pump 61 from the first line 63 and the second line 64, respectively, and closes the second stop valve 73 after the elapse of a predetermined period. Since it is simply required to add the second line 64 and the second stop valve 73 to the first line 63 that exhausts the gas in the enclosure portion 20, it is possible to decrease the required cost as compared to when the three-way valve 71 is provided.

Third Embodiment

Figure 12:
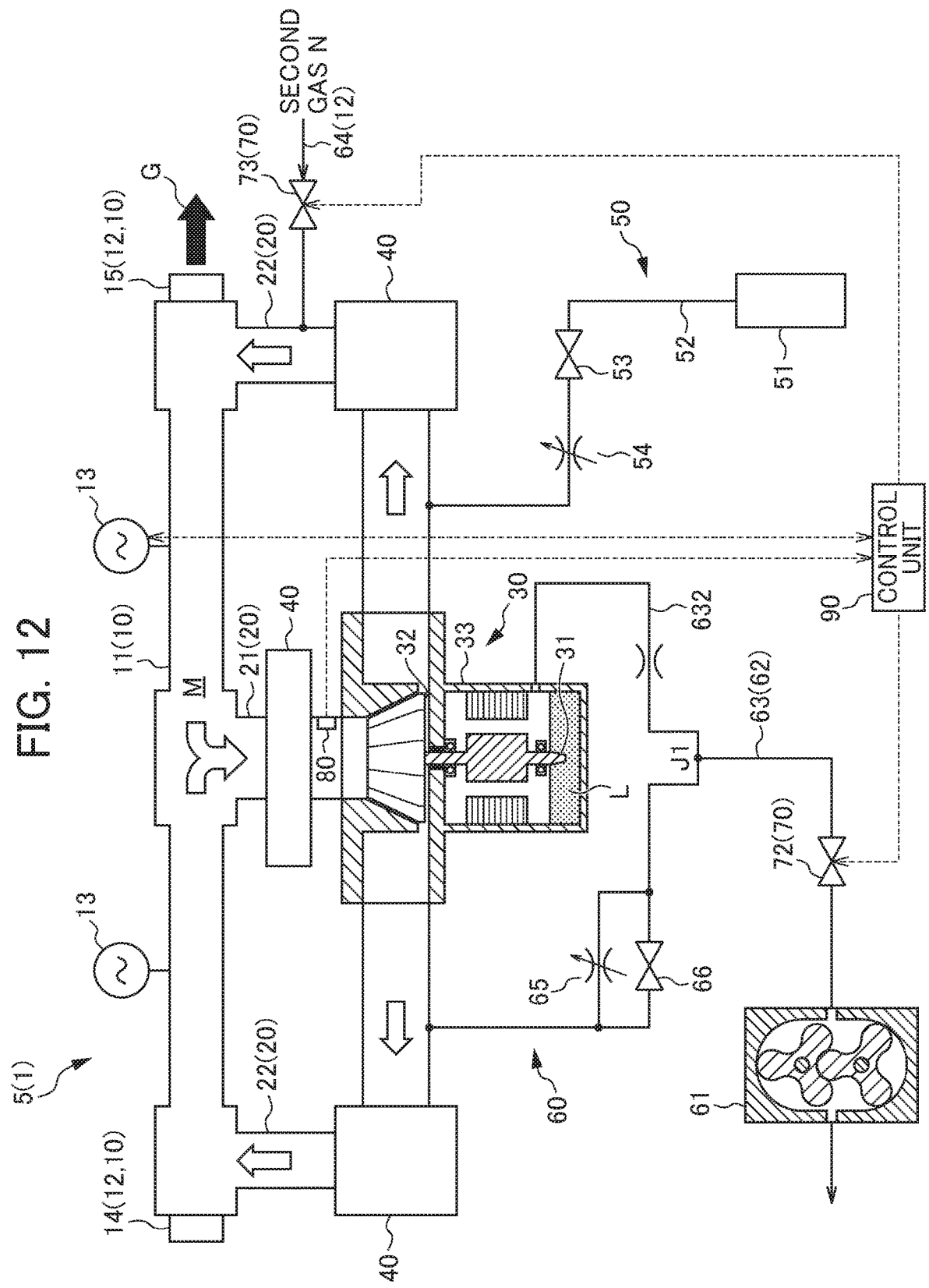
FIG. 12 is a schematic diagram illustrating a laser machining device according to a third embodiment of the present invention.

Next, a laser machining device according to a third embodiment of the present invention will be described with reference to FIG. 12. FIG. 12 is a schematic diagram illustrating a laser machining device according to the third embodiment of the present invention. The laser machining device 1 according to the third embodiment is different from the second embodiment in that the second line 64 is connected to the enclosure portion 20 as illustrated in FIG. 12.

According to the laser machining device 1 of the third embodiment of the present invention, the following advantages are obtained.

(10) The second line 64 is connected to the enclosure portion 20. By introducing the second gas N into the enclosure portion 20, it is possible to exhaust the first gas M in the enclosure portion 20 through the first line 63 and then purge the dry pump 61 using the second gas N. In this way, since the inside of the enclosure portion 20 can be purged, it is possible to extend the time until a dirt is accumulated in the dry pump 61 and to extend the time until a subsequent purging operation is performed.

Fourth Embodiment

Figure 13:
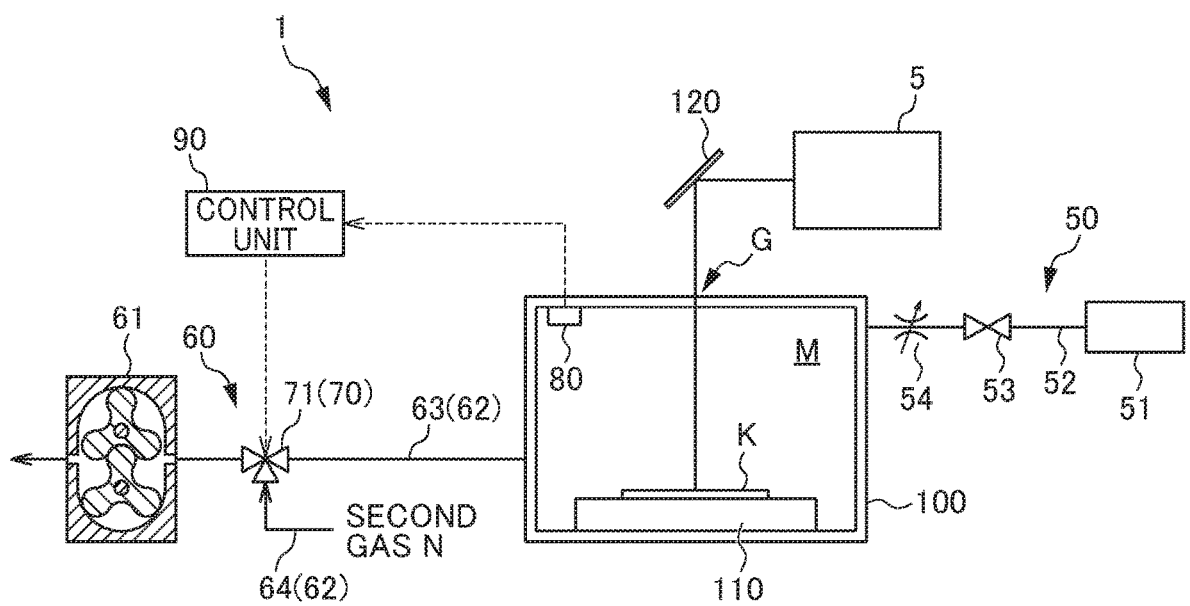
FIG. 13 is a schematic diagram illustrating a laser machining device according to a fourth embodiment of the present invention.

Next, a laser machining device according to a fourth embodiment of the present invention will be described with reference to FIG. 13. FIG. 13 is a schematic diagram illustrating a laser machining device according to the fourth embodiment of the present invention. The laser machining device 1 according to the fourth embodiment is different from the first embodiment in that the enclosure portion 20 is a chamber 100 in which a work is machined as illustrated in FIG. 13. Moreover, the laser machining device 1 according to the fourth embodiment is different from the first embodiment in that an intake portion and an exhausting portion 60 are connected to the chamber 100.

The chamber 100 has a movable table 110 capable of moving while a machining work K mounted thereon. The first gas M is enclosed in the chamber 100, and the chamber 100 is configured so that the laser beam G reflected by a mirror 120 (including a galvano mirror) passes through the chamber 100 to reach the machining work K. The exhausting portion 60 is configured to be able to exhaust a dirt generated as a result of processing the machining work K in the chamber 100 together with the first gas M.

According to the laser machining device 1 of the fourth embodiment of the present invention, the following advantages are obtained.

(11) The exhausting portion 60 can exhaust a dirt generated as a result of processing the machining work K in the chamber 100 together with the first gas M. Since the gas supplied to the dry pump 61 can be switched to any one of the first gas M and the second gas N, it is possible to purge the dry pump 61 using the second gas N only. In this way, since the first gas M including a dirt can be eliminated as compared to a case of performing purging using the first gas M as well, it is possible to improve the purging performance.

Fifth Embodiment

Figure 14:
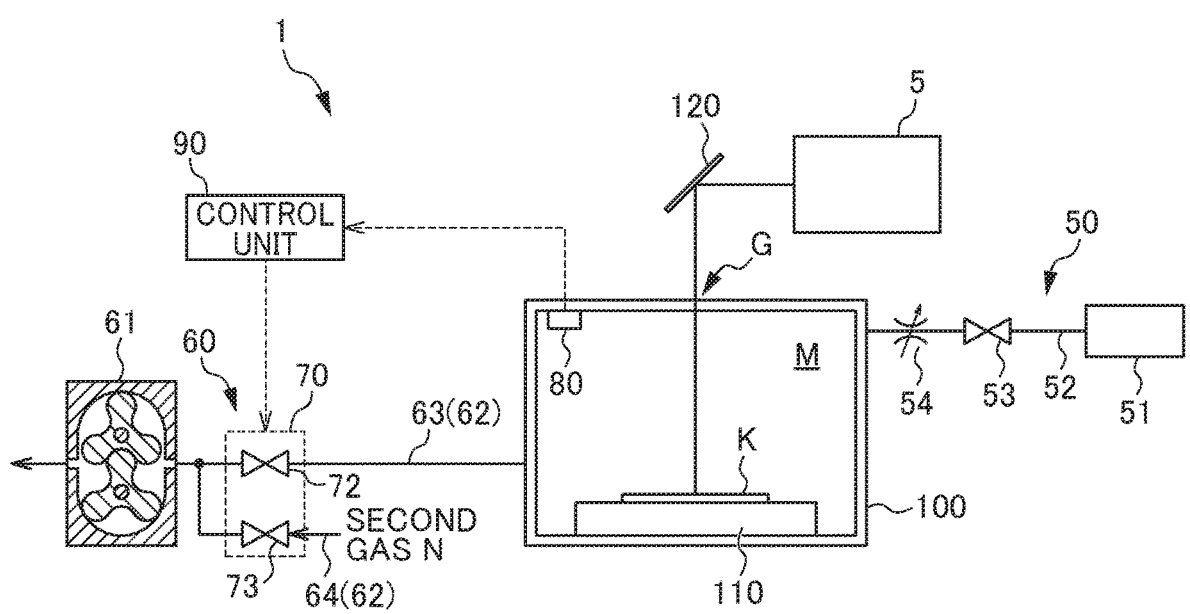
FIG. 14 is a schematic diagram illustrating a laser machining device according to a fifth embodiment of the present invention.

Next, a laser machining device according to a fifth embodiment of the present invention will be described with reference to FIG. 14. FIG. 14 is a schematic diagram illustrating a laser machining device according to the fifth embodiment of the present invention. The laser machining device 1 according to the fifth embodiment is different from the fourth embodiment in that the valve portion 70 includes a first stop valve 72 that opens or closes the first line 63 and a second stop valve 73 that opens or closes the second line 64 as illustrated in FIG. 14. Moreover, in the laser machining device 1 according to the fifth embodiment, the operation of the control unit 90 (the control execution unit 97) that purges the dry pump 61 is different from that of the fourth embodiment. Specifically, the control unit 90 (the control execution unit 97) opens the first stop valve 72 and the second stop valve 73 to supply the first gas M and the second gas N to the dry pump 61 from the first line 63 and the second line 64, respectively, and closes the second stop valve 73 after the elapse of a predetermined period. Alternatively, the control unit 90 (the control execution unit 97) may open the second stop valve 73 to supply the second gas N from the second line 64 to the dry pump 61 and close the second stop valve 73 and open the first stop valve 72 after the elapse of a predetermined period.

According to the laser machining device 1 of the fifth embodiment of the present invention, the following advantages are obtained.

(12) The valve portion 70 includes the first stop valve 72 that opens or closes the first line 63 and the second stop valve 73 that opens or closes the second line 64. Moreover, the control unit 90 opens the first stop valve 72 and the second stop valve 73 to supply the first gas M and the second gas N to the dry pump 61 from the first line 63 and the second line 64, respectively, and closes the second stop valve 73 after the elapse of a predetermined period. Since it is simply required to add the second line 64 and the second stop valve 73 to the first line 63 that exhausts the gas in the enclosure portion 20, it is possible to decrease the required cost as compared to when the three-way valve 71 is provided.

Sixth Embodiment

Figure 15:
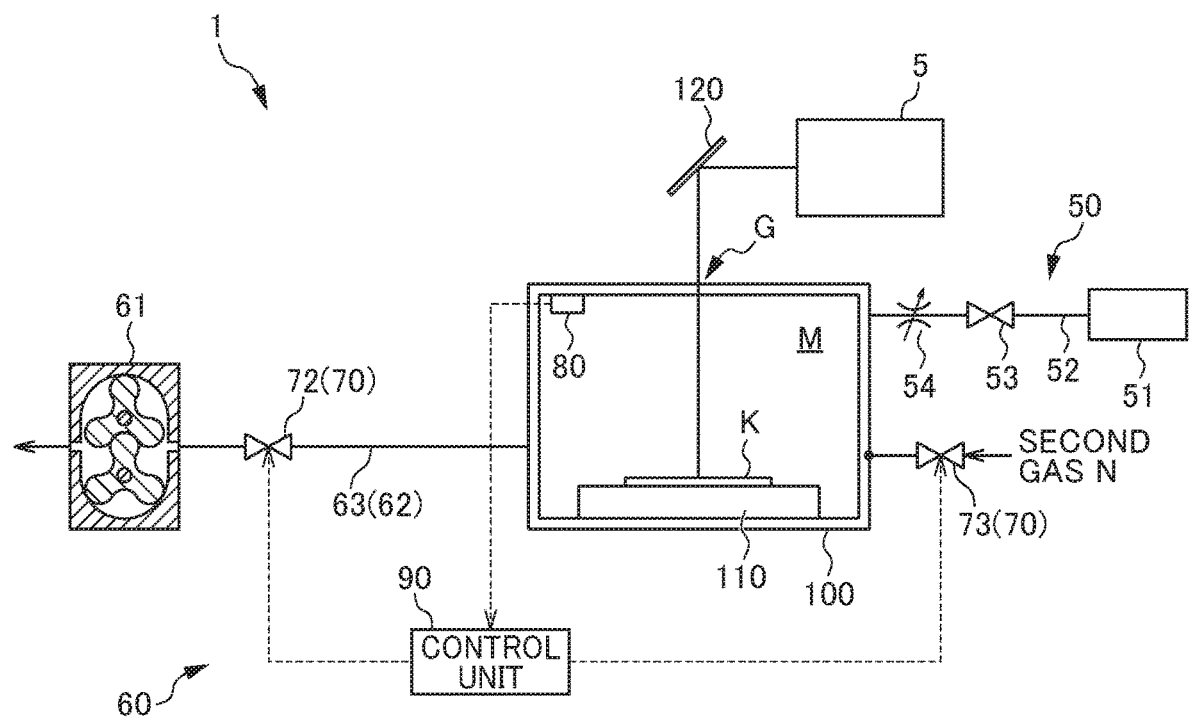
FIG. 15 is a schematic diagram illustrating a laser machining device according to a sixth embodiment of the present invention.

Next, a laser machining device according to a sixth embodiment of the present invention will be described with reference to FIG. 15. FIG. 15 is a schematic diagram illustrating a laser machining device according to the sixth embodiment of the present invention. The laser machining device 1 according to the sixth embodiment is different from the fifth embodiment in that the second line 64 is connected to the enclosure portion 20 as illustrated in FIG. 15.

According to the laser machining device 1 of the fifth embodiment of the present invention, the following advantages are obtained.

(13) The second line 64 is connected to the enclosure portion 20. Since the second gas N is introduced into the enclosure portion 20, it is possible to exhaust the first gas M in the enclosure portion 20 through the first line 63 and then purge the dry pump 61 using the second gas N. In this way, since the inside of the enclosure portion 20 can also be purged, it is possible to extend the time until a dirt is accumulated in the dry pump 61 and to extend the time until a subsequent purging operation is performed.

While preferred embodiments of the laser machining device of the present invention have been described, the present invention is not limited to the above-described embodiments but can be changed appropriately. The present invention embraces modifications and improvements within the range in which the object of the present invention can be attained.

For example, in the respective embodiments, the gas cylinder 51 of the supply portion 50 may be connected so that the second gas N is supplied to the dry pump 61. Moreover, air may be supplied to the dry pump 61 through a filter as the second gas N. The air is supplied to the dry pump 61 with a higher pressure than the first gas M enclosed in the enclosure portion 20.

In the respective embodiments, when the pressure of the first gas M is measured and the purging of the dry pump 61 is performed, the purge execution timing is not limited to the time of activating the laser machining device 1. That is, the purge execution timing may be the stopping timing of the laser machining device 1. In this case, the pressure comparing unit 96 may store the pressure of the first gas M measured during activation in the storage unit 91, compare the measured pressure with the reference pressure during stopping of the laser machining device 1, and execute purging of the dry pump 61.

In the third embodiment, although the connection position of the second line 64 is one of the lead-in lines 22, the connection position may be the other lead-in line 22 or the lead-out line 21.

In the respective embodiments, when the control execution unit 97 controls the valve portion 70 to perform purging the dry pump 61, the control execution unit 97 may cause an informing unit (not illustrated) to inform that purging is executed.

EXPLANATION OF REFERENCE NUMERALS

1: Laser machining device
5: Laser oscillator

10: Oscillating portion
20: Enclosure portion
60: Exhausting portion
61: Dry pump
63: First line
64: Second line
70: Valve portion
71: Three-way valve
72: First stop valve
73: Second stop valve
80: Pressure measurement portion
90: Control unit
G: Laser beam
M: First gas
N: Second gas

What is claimed is:

1. A laser machining device comprising:
an oscillating portion that generates a machining laser beam;
an enclosure portion in which a first gas is enclosed, the first gas being supplied to the enclosure portion from a first gas cylinder; and
an exhausting portion that exhausts the first gas together with a dirt generated in the enclosure portion in association with an operation of the oscillating portion, wherein
the exhausting portion includes:
a dry pump connected to a valve portion, the valve portion being connected to an inlet side of the dry pump;
a first line that connects the enclosure portion and the valve portion;
a second line that supplies a second gas having a higher pressure than the first gas to the valve portion;
the valve portion opens or closes the first line and the second line and allows only either one of the first line or the second line to be in communication with the dry pump; and
a control unit that controls opening or closing of the valve portion to open or close the first line and the second line, such that
the second line is opened to purge the dry pump during a standby state of the laser machining device.

2. The laser machining device according to claim 1, wherein
the second line is connected to an intermediate portion of the first line,
the valve portion is a three-way valve disposed in a connection portion to which the first line and the second line are connected, and
the control unit controls the three-way valve so that the valve switches from a first inflow state in which the first gas flows from the first line to the dry pump to a second inflow state in which the second gas flows from the second line to the dry pump, and the second inflow state switches to the first inflow state after the elapse of a predetermined period.

3. The laser machining device according to claim 1, wherein
the valve portion includes:
a first stop valve that opens or closes the first line; and
a second stop valve that opens or closes the second line, and
the control unit opens the first stop valve and the second stop valve to supply the first gas and the second gas to the dry pump from the first line and the second line, respectively, and closes the second stop valve after the elapse of a predetermined period.

4. The laser machining device according to claim 3, wherein
the second line is connected to the enclosure portion.

5. The laser machining device according to claim 1, wherein
the control unit opens or closes the valve portion on the basis of a predetermined opening/closing timing.

6. The laser machining device according to claim 5, wherein
the control unit opens or closes the valve portion on the basis of a time elapsed from a previous opening/closing operation of the valve portion.

7. The laser machining device according to claim 5, wherein
the control unit opens or closes the valve portion on the basis of a cumulative period from the start of an operation of the oscillating portion.

8. The laser machining device according to claim 5, wherein
the control unit opens or closes the valve portion before the start of an operation of the oscillating portion or after the operation stops.

9. The laser machining device according to claim 1, further comprising:
a pressure measurement portion that measures the pressure of the first gas inside the enclosure portion, wherein
the control unit opens or closes the valve portion on the basis of whether the measured pressure satisfies a predetermined reference pressure.

10. The laser machining device according to claim 9, wherein
the control unit sets an opening period of the second line on the basis of a difference between the measured pressure and the reference pressure.

11. A laser machining device comprising:
an oscillating portion that generates a machining laser beam;
an enclosure portion in which a first gas is enclosed, the first gas being supplied to the enclosure portion from a first gas cylinder; and
an exhausting portion that exhausts the first gas together with a dirt generated in the enclosure portion in association with an operation of the oscillating portion, wherein
the exhausting portion includes:
a dry pump connected to a valve portion, the valve portion being connected to an inlet side of the dry pump;
a first line that connects the enclosure portion and the valve portion;
a second line that supplies a second gas having a higher pressure than the first gas to the valve portion;
the valve portion opens or closes the first line and the second line and allows only either one of the first line or the second line to be in communication with the dry pump, the valve portion being a three-way valve disposed in a connection portion to which the first line and the second line are connected; and
a control unit that controls opening or closing of the valve portion to open or close the first line and the second line and sets an opening period of the second line, such that
the second line is opened to purge the dry pump during a standby state of the laser machining device.

12. A laser machining device comprising:

an oscillating portion that generates a machining laser beam;

an enclosure portion in which a first gas is enclosed, the first gas being supplied to the enclosure portion from a first gas cylinder;

an exhausting portion that exhausts the first gas together with a dirt generated in the enclosure portion in association with an operation of the oscillating portion; and a pressure measurement portion that measures the pressure of the first gas inside the enclosure portion, wherein the exhausting portion includes:

- a dry pump connected to a valve portion, the valve portion being connected to an inlet side of the dry pump;
- a first line that connects the enclosure portion and the valve portion dry pump;
- a second line that supplies a second gas having a higher pressure than the first gas to the valve portion dry;
- the valve portion opens or closes the first line and the second line and allows only either one of the first line or the second line to be in communication with the dry pump; and
- a control unit that controls opening or closing of the valve portion to open or close the first line and the second line such that the second line is opened to purge the dry pump during a standby state of the laser machining device, the second line is connected to an intermediate portion of the first line, the valve portion is a three-way valve disposed in a connection portion to which the first line and the second line are connected, the control unit controls the three-way valve so that the valve switches from a first inflow state in which the first gas flows from the first line to the dry pump to a second inflow state in which the second gas flows from the second line to the dry pump, and the second inflow state switches to the first inflow state after the elapse of a predetermined period, the control unit opens or closes the valve portion on the basis of whether the measured pressure satisfies a predetermined reference pressure, and the control unit sets an opening period of the second line on the basis of a difference between the measured pressure and the reference pressure.

* * * * *